United States Patent [19]
Kobayashi et al.

[11] Patent Number: 5,735,368
[45] Date of Patent: Apr. 7, 1998

[54] DISK BRAKE MOUNTING MEMBER

[75] Inventors: Kinzo Kobayashi; Shinji Suzuki; Kouichi Masuko, all of Yamanashi-ken, Japan

[73] Assignee: Tokico Ltd., Kawasaki, Japan

[21] Appl. No.: 733,782

[22] Filed: Oct. 18, 1996

[30]  Foreign Application Priority Data

Oct. 20, 1995 [JP] Japan ................... 7-297587

[51] Int. Cl.⁶ .................................................. F16D 65/38
[52] U.S. Cl. ........................... 188/73.39; 188/73.47
[58] Field of Search .......................... 188/71.1, 73.1, 188/73.39, 73.41, 368, 369, 370, 72.4, 72.3, 73.44, 73.47

[56]   References Cited

U.S. PATENT DOCUMENTS 4,068,743  1/1978  Karasudani et al. ............. 188/71.1
5,564,532  10/1996  Baba et al. ..................... 188/73.39

*Primary Examiner*—Robert J. Oberleitner
*Assistant Examiner*—Pamela Lipka
*Attorney, Agent, or Firm*—Wenderoth, Lind & Ponack

[57]   ABSTRACT

A disc brake mounting member has a pair of mounts to be secured to a non-rotating part of a vehicle on one side of a disc rotatably provided in the vehicle. The mounting member also has a pair of arms positioned on the outer side of the mounts in a radial direction of the disc for supporting a caliper so that the caliper can slide in the direction of the axis of the disc. The mounts are integrally formed with abutting surfaces, installation holes, and projections. Projections function as stoppers to be engaged by the non-rotating part of the vehicle when the mounting member is inserted between the disc and the non-rotating part.

5 Claims, 10 Drawing Sheets 5,735,368

1

DISK BRAKE MOUNTING MEMBER

BACKGROUND OF THE INVENTION

The present invention relates to a disc brake mounting member used to apply a braking force to, for example, a vehicle, and more particularly to an improved disc brake mounting member installed on a non-rotating part of a vehicle.

A disc brake mounting member is commonly known as a carrier. The member is installed on a non-rotating part secured to a vehicle, called a knuckle. The carrier supports a caliper so that the caliper can move in the direction of the axis of a disc installed on the vehicle. The caliper has an inner part supporting pistons, a disc pass portion extending from the inner part to pass over the disc, and an outer part, called a claw part, extending inwardly from the disc pass portion in the direction of the radius of the disc. The carrier also supports brake pads, i.e., inner and outer pads, positioned on both sides of the disc so that the pads can move in the direction of the axis of the disc. When operating, the pistons press the inner pad against the disc, thus producing a reaction force, which causes the claw part to press the outer brake pad against the disc, resulting in braking.

While supporting the caliper, brake pads, and other accessories, the carrier is moved until it is placed in a predetermined position relative to the knuckle, where bolts and the like secure the carrier to the knuckle. Conventional carriers pose a problem of being difficult to place in a predetermined position. What is worse, the boots and pad springs supported by conventional carriers may be damaged when they are placed in the predetermined position.

SUMMARY OF THE INVENTION

It is an object of the present invention, in the light of the foregoing problems with prior art, to provide a disc brake mounting member that solves a problem of protective boots and pad springs being damaged or broken when a disc brake is installed on a non-rotating part of a vehicle and that significantly increases the efficiency of disc brake installation.

To solve the problems described above, the present invention applies to a disc brake mounting member having a pair of mounts that are fastened to a non-rotating part of a vehicle on one side of a disc and a pair of arms, positioned on the outer side of the mounts in the direction of the radius of the disc, which arms support a caliper so that the caliper can move in the direction of the axis of the disc.

The pair of mounts are each provided with an abutting surface pressed against the non-rotating part of the vehicle. A mounting hole extends in the direction of the axis of the disc and is positioned in the central portion of the abutting surface so that a positioning member is received in each hole for connection of the mounts to the non-rotating part of the vehicle. Also, a projection projects in the direction of the axis of the disc, and the projection is positioned on the outer side of the abutting surface in the direction of the radius of the disc.

2

Figure 4:
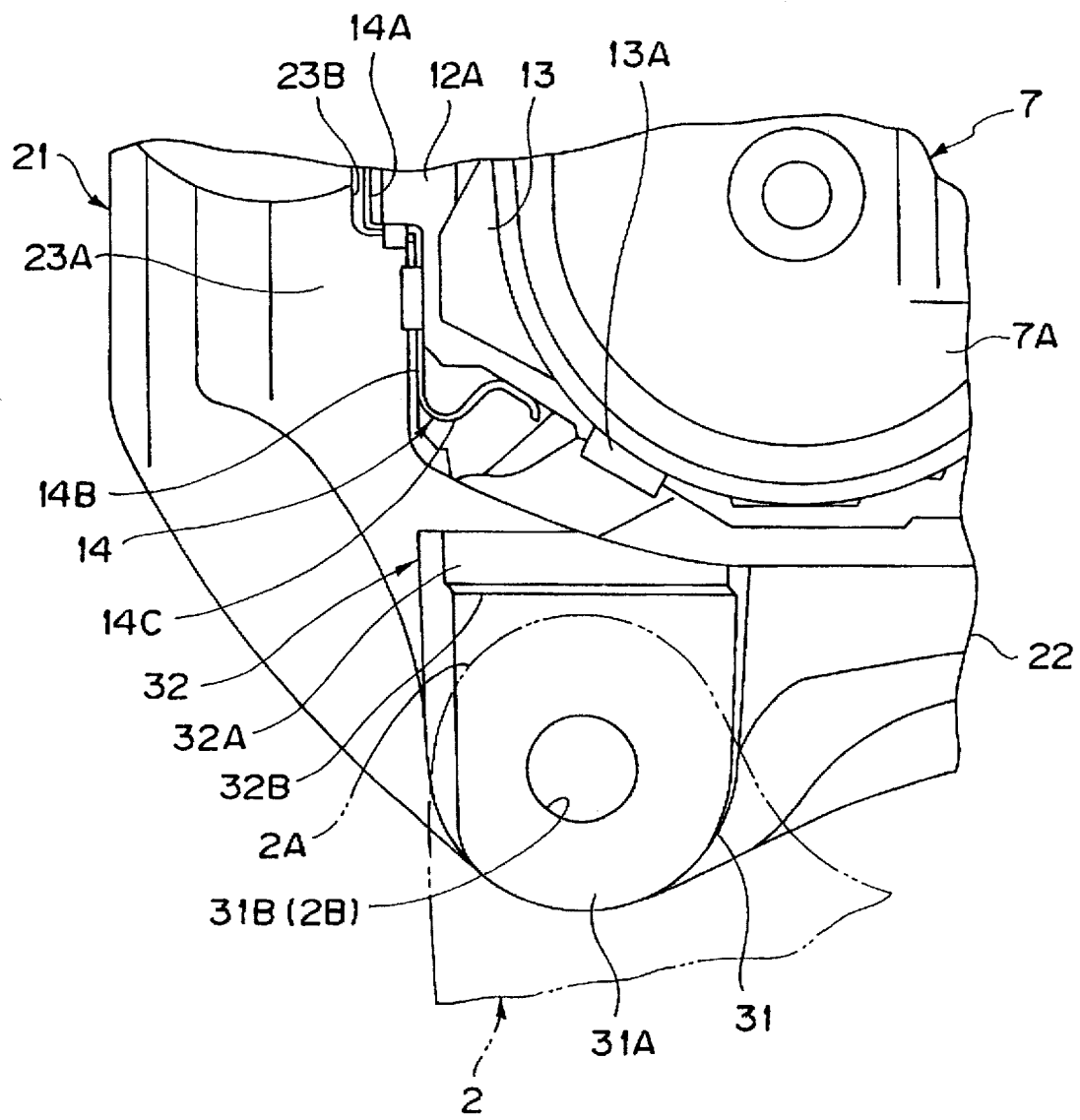

FIG. 4 is an enlarged view showing a caliper, pad spring, and mounting member mounts of a disc brake according to a second embodiment of the present invention.

Figure 2:
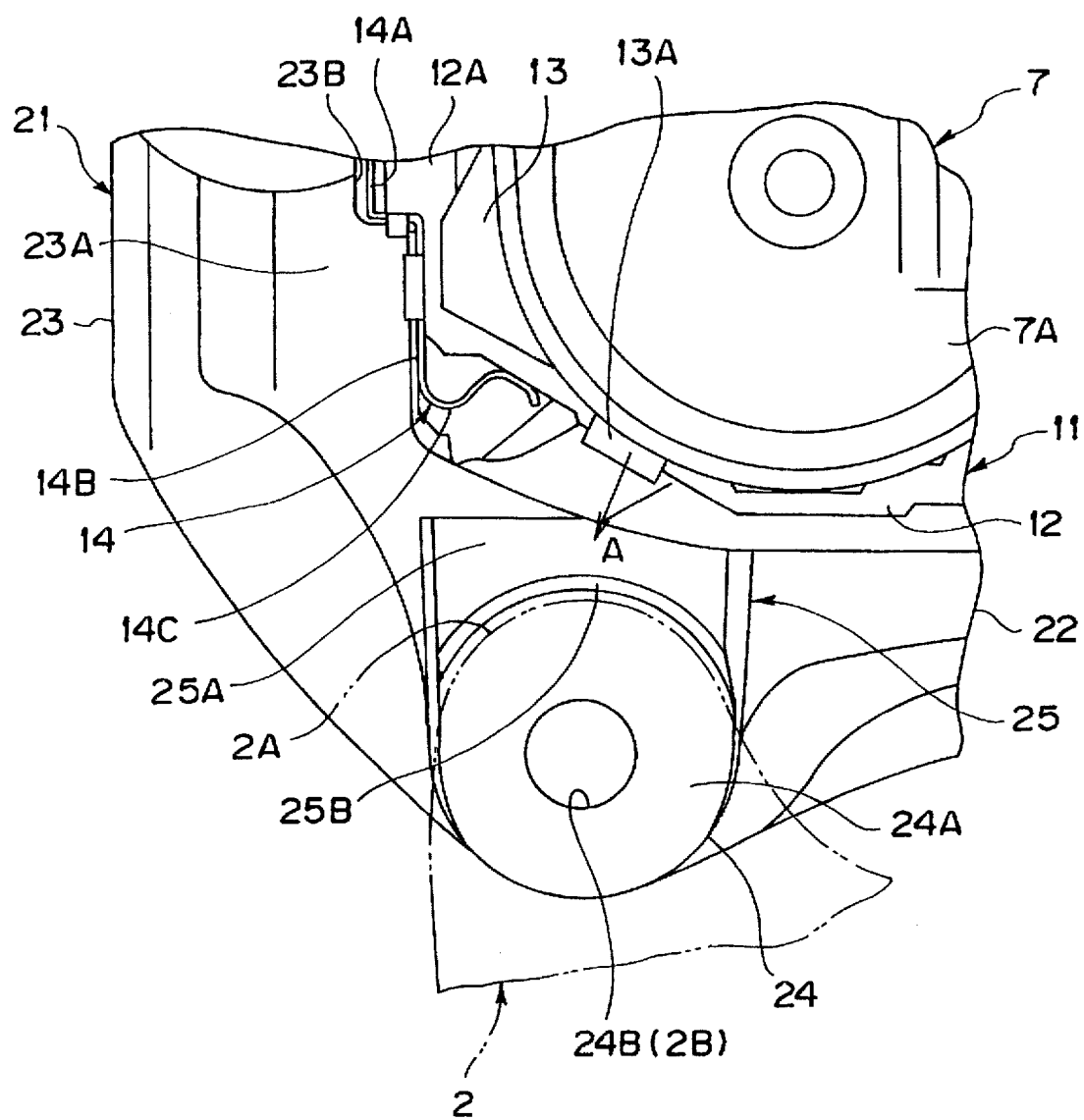
FIG. 2 is an enlarged view showing a caliper, pad spring, and mounting member mounts of the disc brake in FIG. 1.
Figure 5:
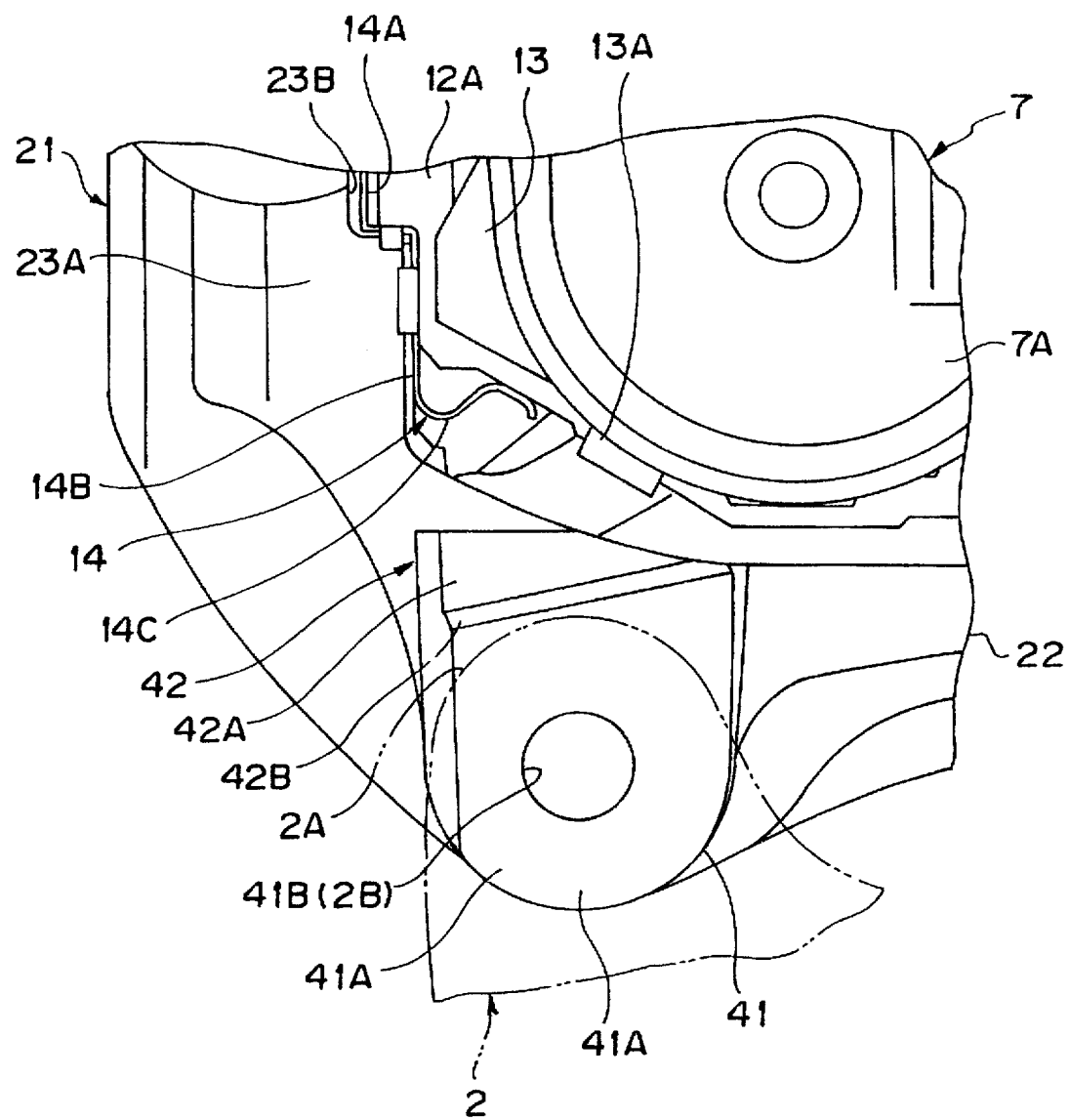

FIG. 5 is an enlarged view showing a caliper, pad spring, and mounting member mounts of a disc brake according to a third embodiment of the present invention, which is similar to FIG. 2.

Figure 6:
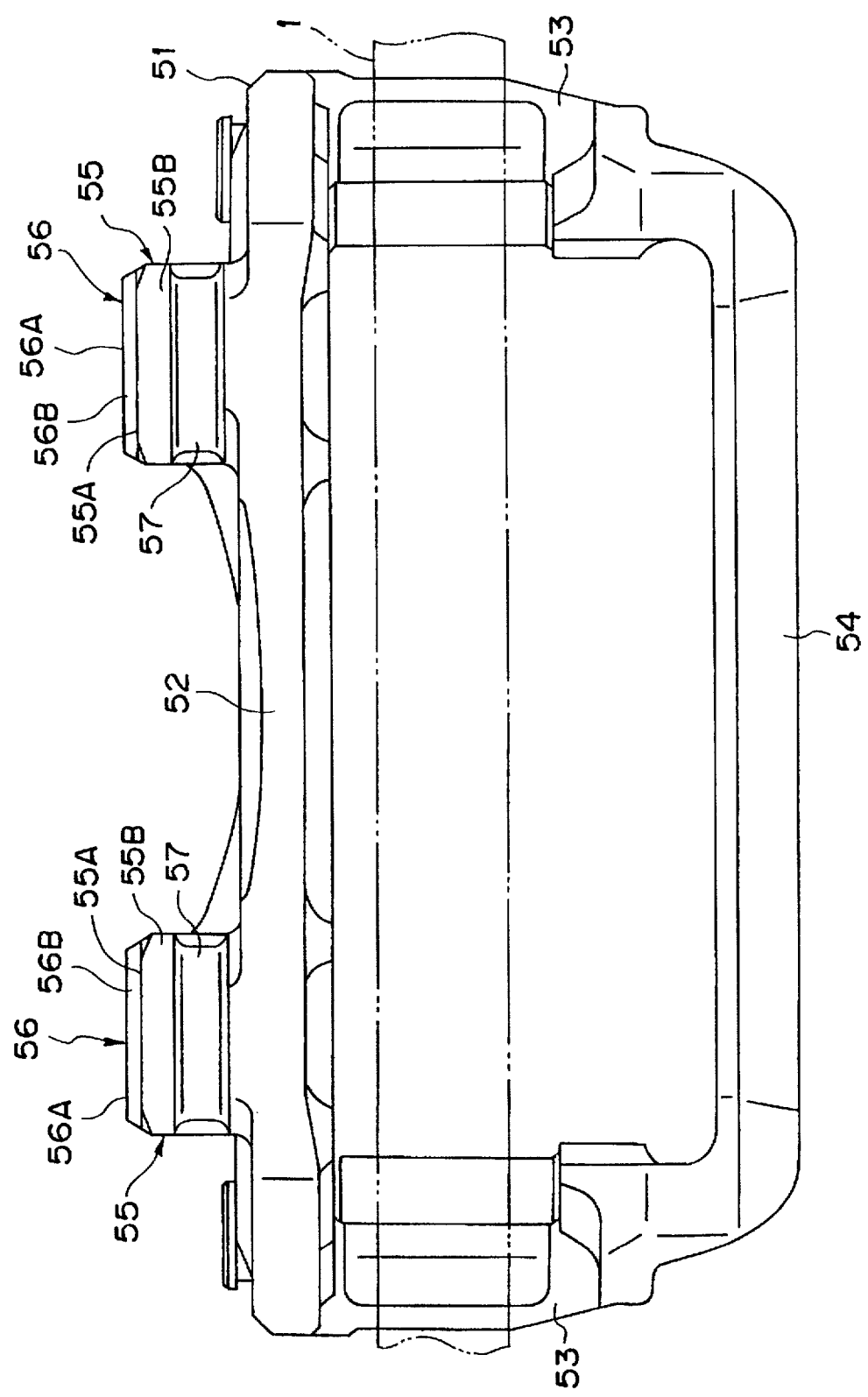

FIG. 6 is a bottom view of a disc brake mounting member according to a fourth embodiment of the present invention.

Figure 7:
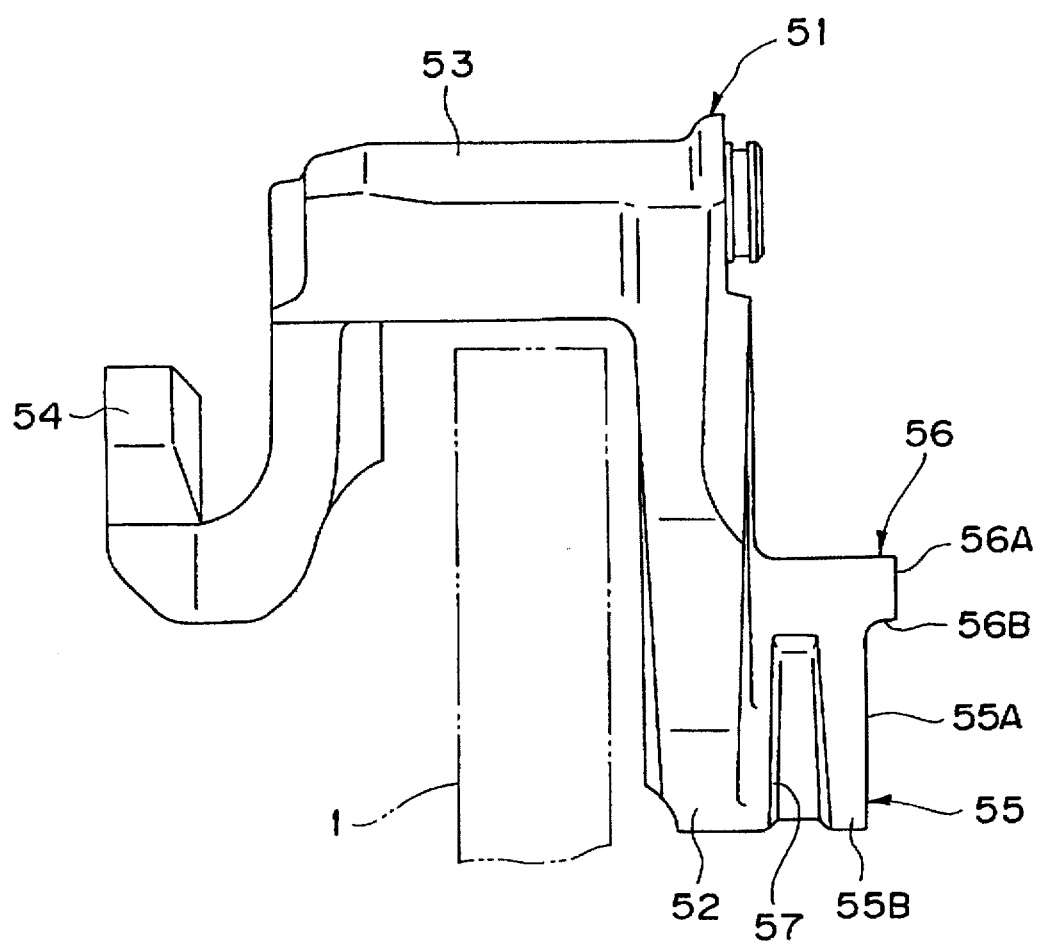

FIG. 7 is a side view of the disc brake mounting member in FIG. 6.

Figure 8:
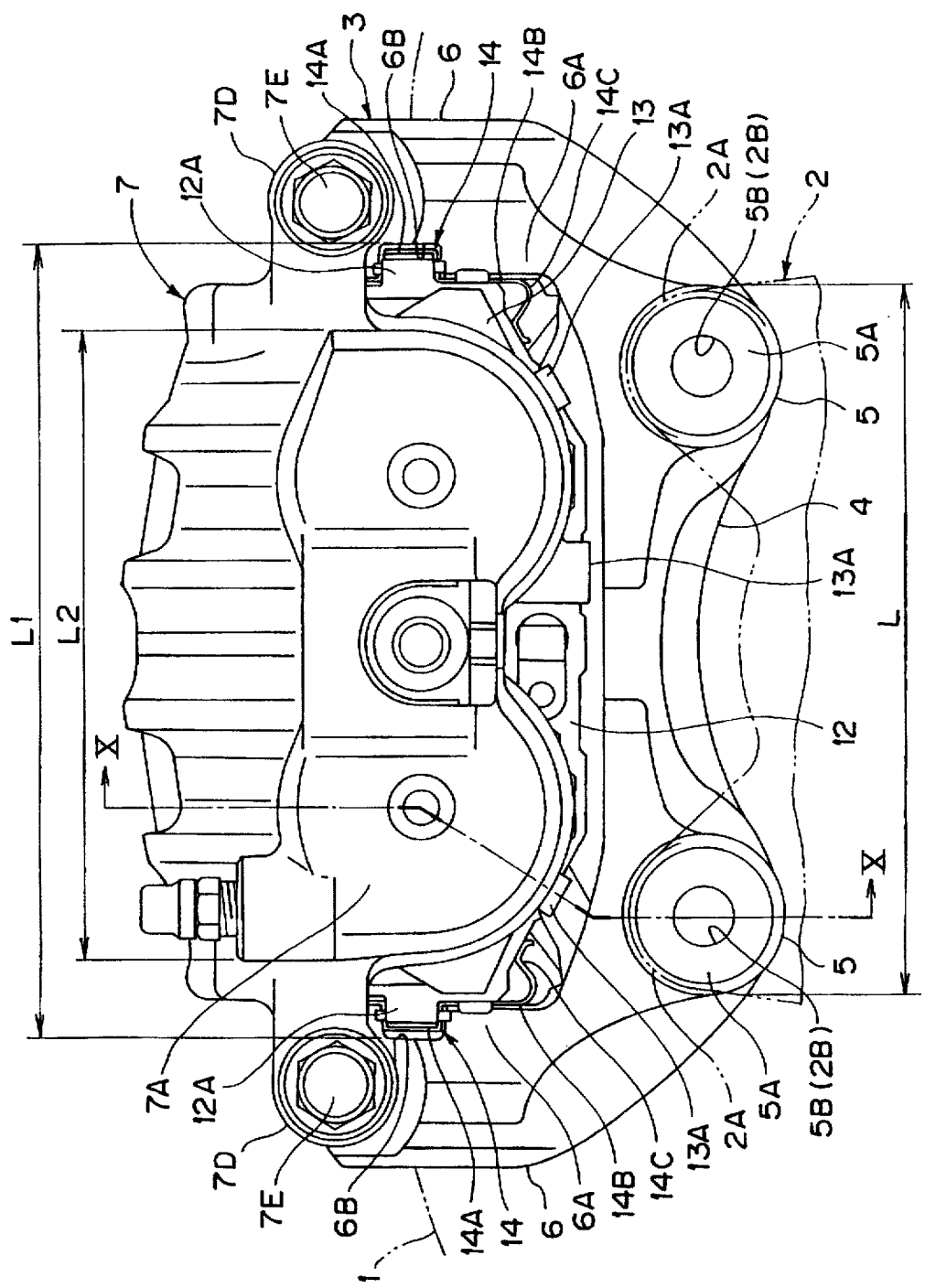

FIG. 8 is a front view of a disc brake according to prior art.

Figure 9:
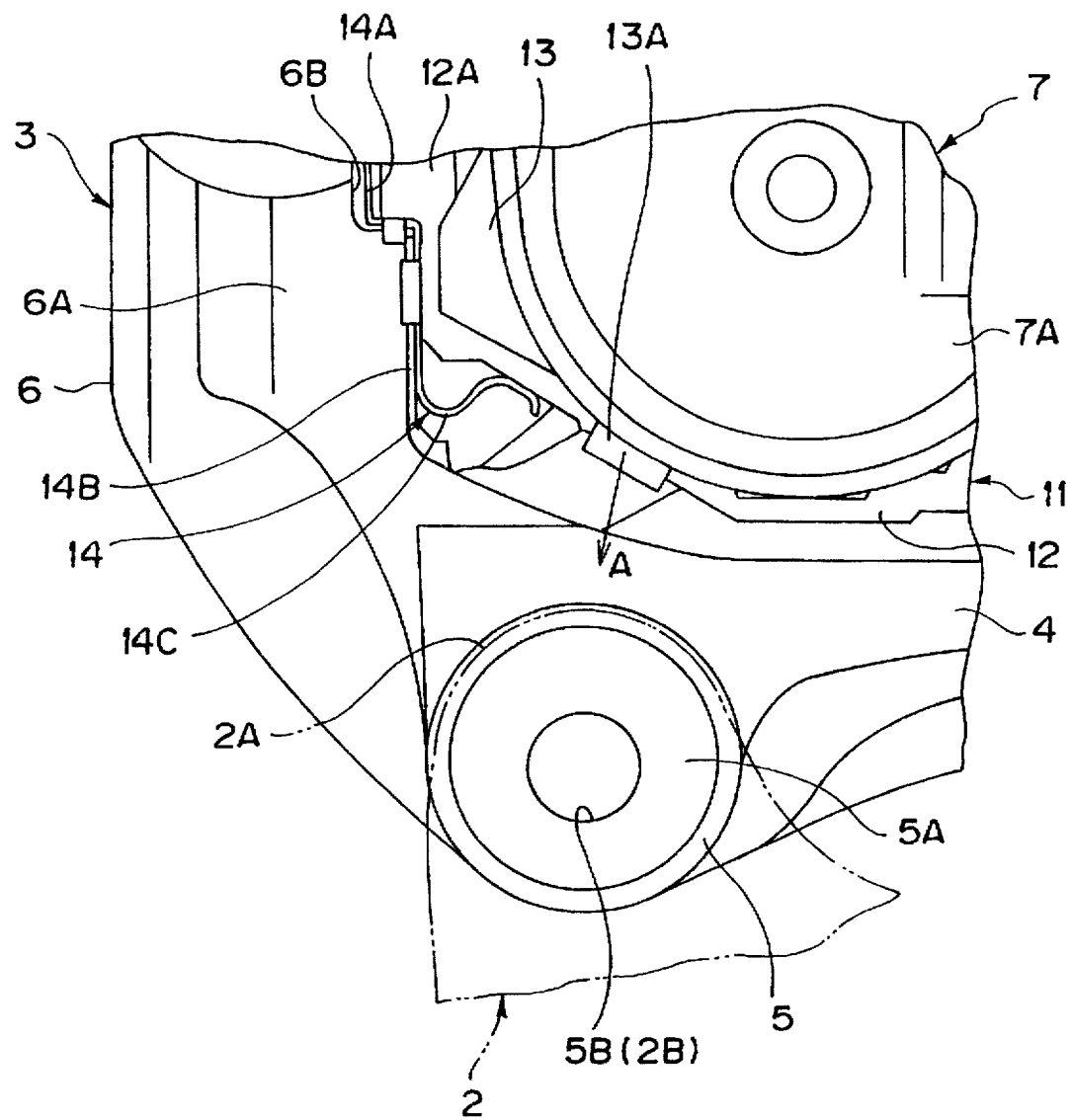

FIG. 9 is an enlarged view of a caliper, pad spring, and mounting member mounts of the disc brake in FIG. 8.

Figure 10:
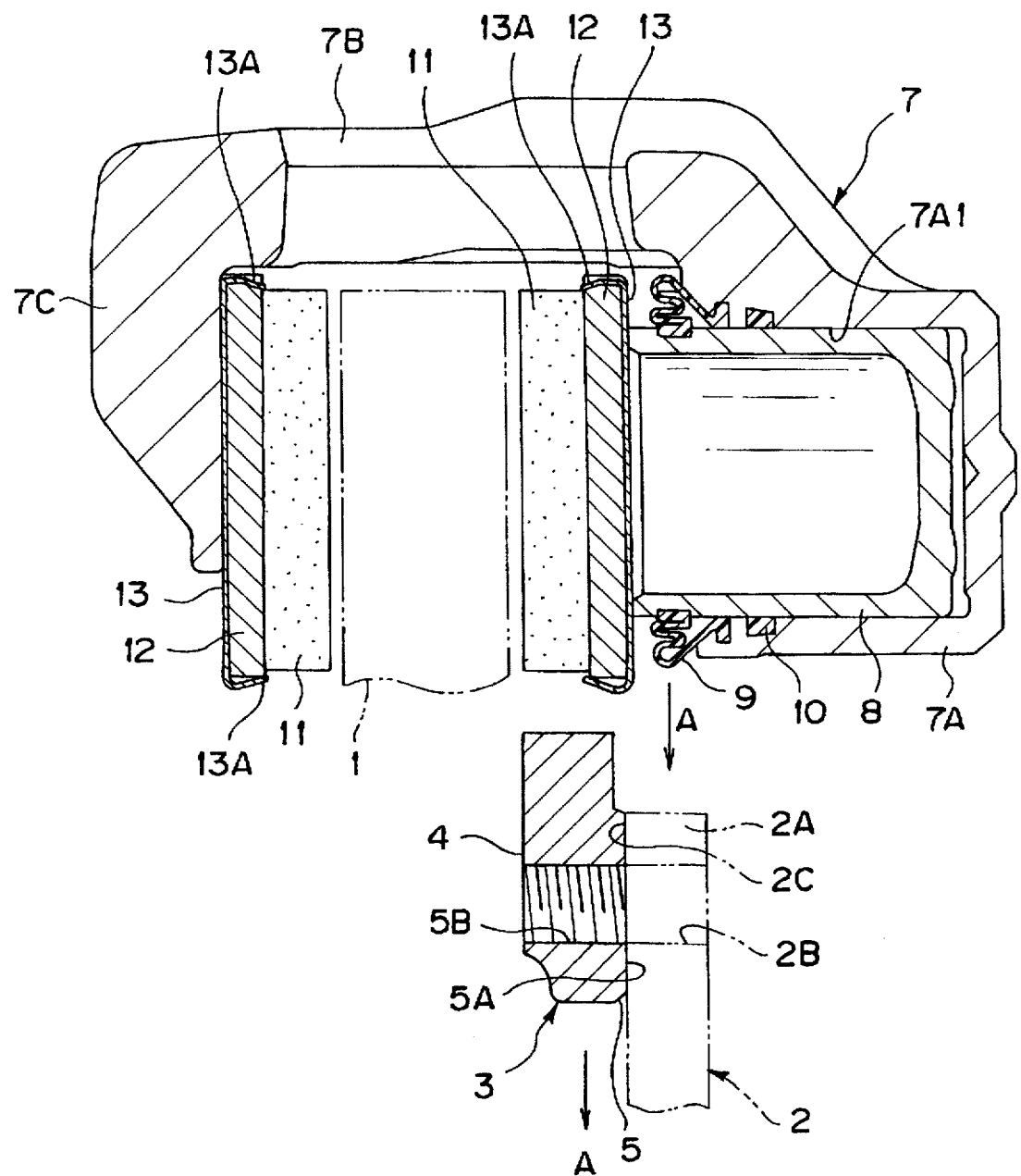

FIG. 10 is an enlarged view of a cross section taken along line X—X in FIG. 8.

DETAILED DESCRIPTION OF THE INVENTION

To help understand the present invention, a disc brake mounting member is described below which is according to the prior art believed to be closest to the present invention.

FIGS. 8 and 10 show an automotive disc brake according to prior art.

In FIGS. 8, 9 and 10, numeral 1 designates a disc rotating together with a wheel of an automobile, and numeral 2 indicates a knuckle constituting a portion of a non-rotating part of the automobile. The knuckle 2 is positioned on one side of the disc (called inner side hereafter) in the direction of the axis of the disc 1, and the end of the knuckle 2 is flat and extending along the periphery of the disc 1 as shown in FIGS. 8 and 10. At one end of the knuckle 2, a pair of supports 2A apart from each other in the direction of the periphery of the disc 1 are provided which project outwardly to have the contours of a substantially circular arc in the direction of the radius of the disc 1. At the center of each of the supports 2A, a bolt hole 2B is formed in the direction of the axis of the disc 1 for connection of a mount 5.

The face of each of the supports 2A, which faces the disc 1, is a mating surface 2C corresponding to the abutting surface 5A of the mount 5. The maximum distance between the supports 2A (hereinafter called the distance between the supports 2A) is a dimension L as shown in FIG. 8.

Numeral 3 designates a disc brake mounting member installed to the knuckle 2, which member constitutes a portion of the disc brake. As shown in FIG. 8, the disc brake mounting member 3 is produced by, for example, casting a disc brake mounting member body 4, extending in an arc between the supports 2A, and arms 6, described later, as a unit. The disc brake mounting member body 4 is integrally formed with a pair of mounts 5 formed at positions apart from each other in the direction of the length of the body so that they are opposed to the supports 2A. The maximum distance between the mounts 5 (hereinafter called the distance between the mounts 5) is the same dimension L as that between the supports 2A as shown in FIG. 8.

As shown in FIGS. 9 and 10, the face of each of the mounts 5 is a substantially circular, flat abutting surface 5A, whose surroundings are indented (the mounts 5 have their sides tapered in the example of FIGS. 9 and 10). The mounts 5 each has a threaded hole 5B for installation, formed at the center of the abutting surface 5A, and the threaded hole 5B extends in the direction of the axis of the disc 1.

The mounting member 3 is positioned so that the mating surfaces 2C are pressed against the abutting surfaces 5A, with the threaded holes 5B in the mounts 5 aligned with the bolt holes 2B in the knuckle 2. The mounting member 3 is secured to the knuckle 2 by screwing bolts (as positioning members), not shown, into the bolt holes 2B and threaded holes 5B.

Numerals 6 indicate a pair of arms apart from each other in the direction of the circumference of the disc 1, which are positioned on the outer side of the mounts 5 in the direction of the radius of the disc 1. The inner side, or base end, of each of the arms 6 is integrally joined to the mounting member body 4 at the opposite end portions (in the lengthwise direction of the body 4). The outer side (not shown), or head side of each arm 6 extends beyond the circumference of the disc 1 in the axial direction.

As shown in FIGS. 8 and 9, a torque receiver 6A (only the inner side thereof is shown) and a pad guide 6B (only the inner side thereof is shown), whose cross section is substantially concave, are formed on the bottom and head sides of each of the arms 6. The pad guide 6B guides a friction pad 11, described later, and in cooperation with a pad spring 14 so that the pad can slide in the direction of the axis of the disc 1. The distance between pad guides 6B is set to a dimension L1 a little longer than the dimension L between the mounts 5. The pad guides 6B on the inner side are positioned on the outer side of the mounts 5 in the direction of the radius of the disc 1.

Numeral 7 designates a caliper slidably supported by the arms 6 of the mounting member 3. As shown in FIG. 10, the caliper 7 consists of an inner leg 7A positioned on the inner side of the disc 1 and having two cylinder bores 7A1 separated from each other in the direction in which the mounts 5 are apart from each other; a bridge 7B extending from the inner leg 7A to the outer side of the disc 1 and passing over the circumference of the disc 1 between the arms 6; an outer leg 7C extending in substantially parallel with the inner leg 7A from the head end of the bridge 7B, which leg is positioned on the outer side of the disc 1; and a pair of joints 7D projecting from both ends of the inner leg 7A to the right and left as shown in FIG. 8.

The maximum distance between the cylinder bores 7A1 of the inner leg 7A (hereinafter called the distance between the cylinder bores 7A1) is set to a dimension L2 a certain length shorter than the dimension L between the mounts 5. The cylinder bores 7A1 of the inner leg 7A are positioned on the outer side of the mounts 5 in the direction of the radius of the disc 1.

One end of sliding pins (not shown) are integrally attached to the joints 7D of the caliper 7 through bolts 7E or the like, and the other end of each pin is inserted into a pin hole (not shown) formed in each of the arms 6. The sliding pins mount the caliper 7 on the arms 6 so that the caliper can slide in the direction of axis of the disc 1.

Numerals 8 indicate pistons (only one of these is shown) inserted into the cylinder bores 7A1 in the inner leg 7A. As shown in FIG. 10, the pistons 8 are formed into cylinders having a bottom so that the circumferential surfaces of the pistons match the shape of the cylinder bores 7A1. The axial dimension of the pistons is a predetermined length longer than the axial dimension of the cylinder bores 7A1. Even with the pistons 8 completely accommodated in the cylinder bores 7A1 of the inner leg 7A, the open ends of the pistons 8 project a predetermined dimension from that of the cylinder bores 7A1 so that the open end surfaces of the pistons 8 always abut against the backings 12 of friction pads 11, described later.

Protective boots 9 (only one of these is shown) formed into ring-shaped bellows from elastic material, such as rubber, are installed at the open ends of the pistons 8 between them and inner leg 7A. As the pistons 8 extend and retract relative to the inner leg 7A, the protective boots 9 expand and contract to prevent external dust from being lodged between the inner leg 7A and the pistons 8. Like the cylinder bores 7A1 of the inner leg 7A, the protective boots 9 are positioned on the outer side of the mounts 5 in the direction of the axis of the disc 1.

Piston seals 10 (only one of these is shown), formed from elastic material, such as rubber, are installed between the cylinder bores 7A1 of the inner leg 7A and the pistons 8. When the pistons 8 move relative to the cylinder bores 7A1, the piston seals 10 elastically deform due to friction between pistons and seals, tending to follow the pistons. Upon removing hydraulic pressure from the pistons, the seals apply to the pistons 8 urging force in such a direction that the pistons 8 withdraw into the cylinder bores 7A1 of the inner leg 7A.

When brake hydraulic pressure is supplied to the cylinder bores 7A1 of the inner leg 7A, the pistons 8 slide in the cylinder bores 7A1 to press the friction pads 11 against both sides of the disc 1 between the outer leg 7C and the pistons.

Numerals 11 indicate inner and outer friction pads positioned on both sides of the disc 1. The friction pads 11 are formed into a substantially fanlike shape longer in the direction from side to side, and backings 12 are attached to the back of the friction pads so that the backings overlap with the pads. As shown in FIG. 8, ears 12A, protruding to correspond to the pad guides 6B of the arms 6, are provided at both lengthwise ends of the backings 12. The ears 12A are inserted through the guide plates 14A of pad springs 14, described later, into the pad guides 6B of the arms 6. The friction pads 11, supported by the pad guides 6B through the ears 12A so that the pads can slide, are adapted to be pressed against both sides of the disc 1 by the caliper 7 in order to apply a braking force to the disc 1.

Numerals 13 indicate shim plates attached to the backs of the backings 12. A plurality of claws 13A apart from each other are provided on the circumference of the shim plates 13.

Numerals 14 designate a pair of pad springs installed to the arms 6 of the mounting member 3. As shown in FIGS. 8 and 9, the inner side portions of the pad springs 14 comprise a pair of guide plates 14A (only the inner side ones are shown), bent substantially to a U-shape so that the plates engage the pad guides 6B of the arms 6; a pair of torque receiver plates 14B (only the inner side ones are shown), bent at substantially right angles to the lower end of the guide plates 14A, which receiver plates extend downward and engage the torque receiver portions 6A; and a pair of pad receiver plates 14C, bent substantially into an S-shape at the lower ends of the torque receiver plates 14B toward the lower end surfaces of the friction pads 11, the ends of which plates rest against the lower end surfaces of the friction pads 11 and the backings 12. Pad springs, arranged as the described pad springs 14, are also provided on the outer side. Joint plates joining the guide plates 14A together at their ends integrate the inner side and outer side springs with each other, so that the springs constitute a unitary pad spring.

The pad receiver plates 14C on the inner side are positioned on the outer side of the mounts 5 in the direction of the radius of the disc 1 together with the pad guides 6B of the arms 6. Using the spring force of the pad receiver plates 14C, the pad springs 14 press the ears 12A of the backings 12 against the upper surfaces of the pad guides 6B (guide plates 14A) of the arms 6 to make the friction pads 11 slidably guided in the direction of the axis of the disc 1 by supporting the ears 12A together with the pad guides 6B.

Disc brakes according to prior art are arranged as described above. When such a disc brake is actuated, the pistons 8 in the inner leg 7A (in the cylinder bores 7A1) of the caliper 7 slide toward the disc 1 due to hydraulic fluid supply from outside the brake to press the friction pads 11 against both sides of the disc 1 between the outer leg 7C and the pistons, thus applying a braking force to the disc 1. When the disc brake operation is stopped, hydraulic fluid supply to the pistons 8 is shut off, so that the piston seals 10 withdraw the pistons 8 into the inner leg 7A and that the friction pads 11 are separated a predetermined dimension from both sides of the disc 1.

To install the mounting member 3 to the knuckle 2, a worker inserts the mounts 5 of the mounting member 3 between the inner side of the disc 5 and the supports 2A of the knuckle 2 inwardly from outside the disc 1 in the direction A shown by the arrow in FIG. 10 and makes the mating surfaces 2C abut against the abutting surfaces 5A, with the threaded holes 5B of the mounts 5 aligned with the bolt holes 2B of the knuckle 2. Then the worker screws bolts or the like (not shown) into the bolt holes 2B and the threaded holes 5B to tightly secure the mounts 5 of the mounting₀ member 3 to the supports 2A of the knuckle 2.

In the prior art described above, the mounts 5 of the mounting member 3 are secured to the supports 2A of the knuckle 2. When a worker inserts the mounts 5 of the mounting member 3 between the inner side of the disc 1 and the supports 2A of the knuckle 2 inwardly from outside the disc 1 in the direction shown by the arrow A in FIG. 10, the caliper 7 and the friction pads 11 are already installed to the mounting member 3. The weight of the caliper and friction pads may therefore act on the mounting member 3 to excessively slide the mounting member 3 in the direction shown by arrow A so that the abutting surfaces 5A of the mounts 5 pass the position at which the abutting surfaces 5A are to be mated with the mating surfaces 2C of the knuckle 2.

Thus the prior art may allow the protective boots 9 and the like attached to the caliper 7 to hit against the supports 2A of the knuckle 2, thereby causing the protective boots 9 to be damaged or broken when the mounting member 3 is excessively inserted (slid) in the direction shown by arrow A in FIG. 10. What is worse, for the pad springs 14 attached to the arms 6 of the mounting member 3, the pad receiver plates 14C or the like on the inner side may hit against the supports 2A of the knuckle 2, causing the pad receiver plates 14C to be damaged or broken.

Referring now to FIGS. 1 through 7, embodiments of the present invention are described in detail. In FIGS. 1 through 7, the same elements as in FIGS. 8, 9 and 10 are given the same reference numbers to omit the descriptions of the elements.

Figure 1:
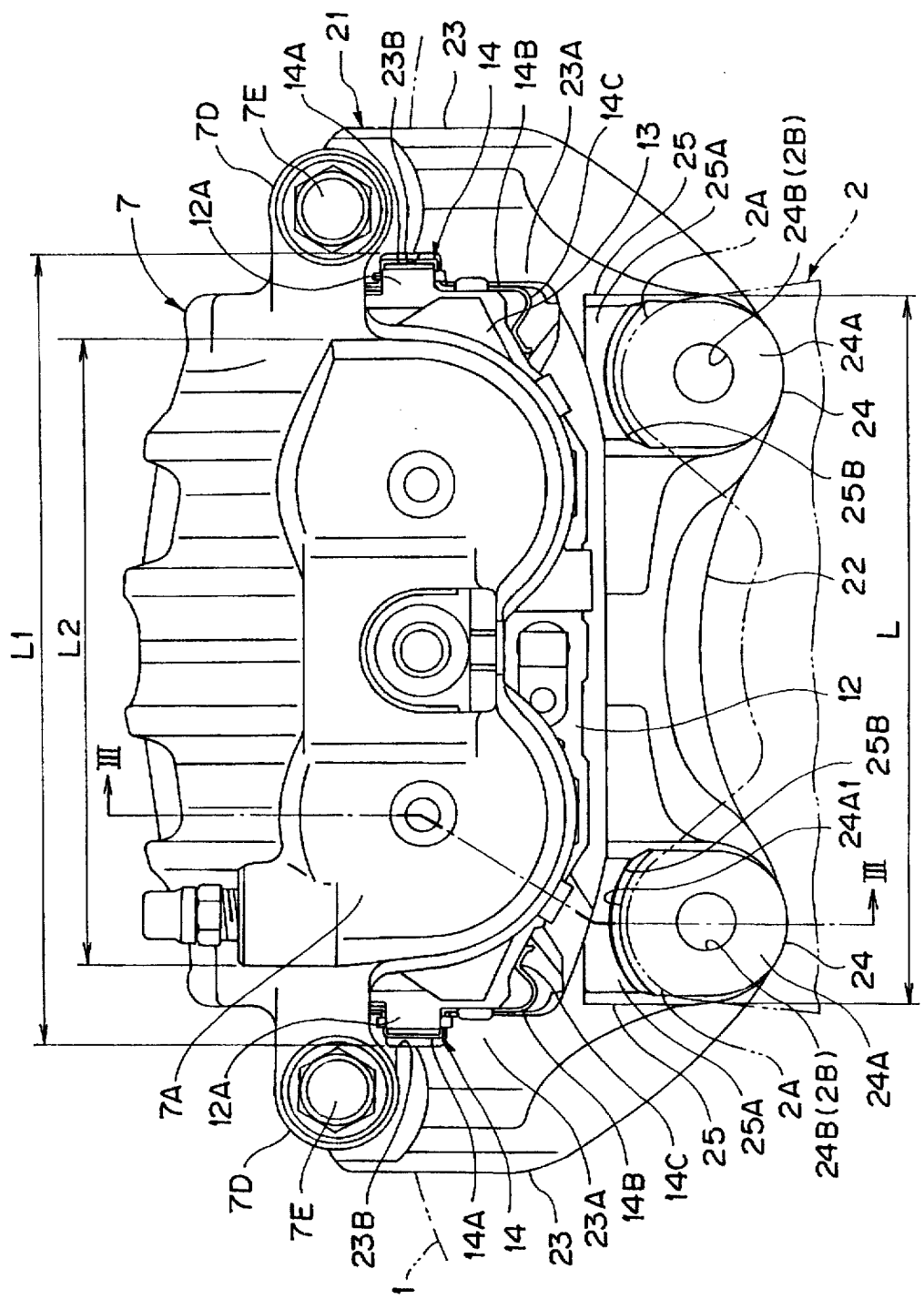
FIG. 1 is a front view showing a disc brake according to a first embodiment of the present invention.
Figure 3:
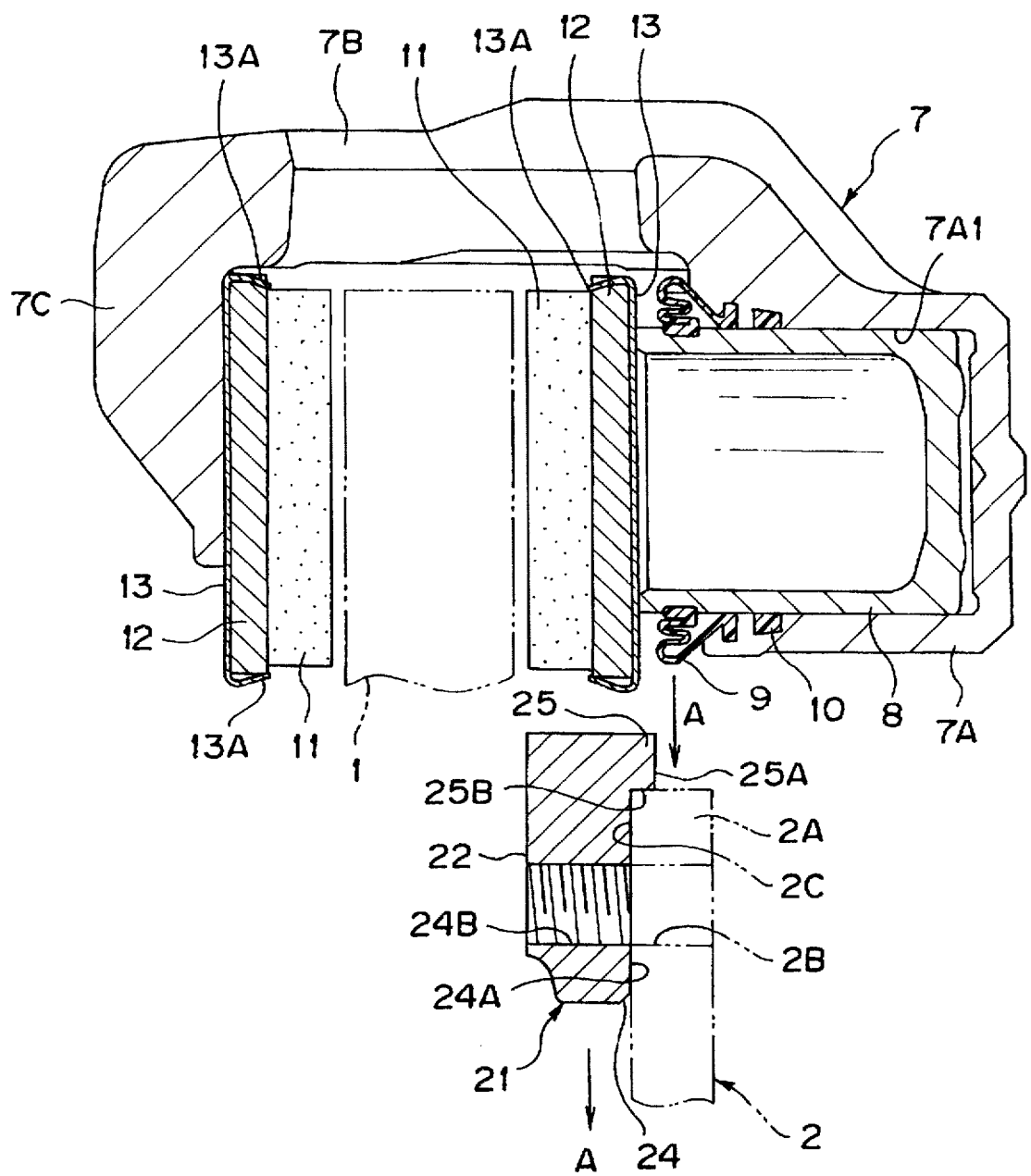
FIG. 3 is an enlarged view of a cross section taken along line III—III in FIG. 1.

FIGS. 1, 2 and 3 show a first embodiment of the present invention.

In FIGS. 1, 2 and 3, numeral 21 designates a disc brake mounting member according to the first embodiment. Like the mounting member 3 described with reference to FIGS. 8, 9 and 10, the disc brake mounting member 21 comprises a mounting member body 22, extending in an arc between the supports 2A of the knuckle 2, and arms integrally formed at the lengthwise ends of the mounting member body 22 and positioned on the outer side of the mounting member body 22 in the direction of the radius of the disc 1. The arms have torque receivers 23A and pad guides 23B on the inner and outer sides. The lengthwise ends of the mounting member body 22 have mounts 24, described later.

Numerals 24 indicate mounts integrally formed at the lengthwise ends of the mounting member body 22. Like the mounts 5 described with reference to FIGS. 8, 9 and 10, the mounts 24, which are apart from each other, by a dimension L, in the direction of the length of the mounting member body 22, are formed to be substantially U-shaped as shown in FIGS. 1 and 2. The upper portions of abutting surfaces 24A have projections 25, projecting a certain dimension in the direction of the axis of the disc 1. The mounts 24 each has a threaded hole 24B for installation, opened at the center of an abutting surface 24A and extending in the direction of the axis of the disc 1.

With the threaded holes 24B in the mounts 5 aligned with the bolt holes 2B, the mating surfaces 2C are rested against the abutting surfaces 24A, and positioning members, such as bolts, not shown, are screwed into the bolt holes 2B and threaded holes 5B to secure the mounting member 21 to the knuckle 2.

Numerals 25 indicate projections formed integrally with the mounts 24 and positioned on the outer side of the abutting surfaces 24A in the direction of the radius of the disc 1. As shown in FIGS. 1 and 2, the projections have substantially concave surfaces facing inwardly in a radial direction of the disc and, as shown in FIG. 3, project in the direction of the axis of the disc 1.

As shown in FIG. 3, the projections 25 have a predetermined thickness so that the faces 25A thereof are offset a certain dimension from the abutting surfaces 24A of the mounts 24 in the direction of the axis of the disc 1. The projections form substantially concave surfaces or walls 25B at the boundaries between the projections themselves and the abutting surfaces 24A.

When the abutting surfaces 24A are rested against the mating surfaces 2C to install the mounts 24 to the knuckle 2, the walls 25B are brought into contact with the supports 2A for purposes of engagement to reliably prevent the mounting member 21 from being excessively inserted (slid) together with a caliper 7 in the direction shown by arrow A.

A disc brake mounting member according to the present invention is arranged as described above, which does not widely differ in basic operation from one according to prior art.

In the embodiment, the mounts 24 (mounting member 21) are formed to be substantially U-shaped, and the projections 25 are formed on the outer side of the abutting surfaces 24A in the direction of the radius of the disc 1 to be integral with the mounts 24. Moreover, the lower surfaces of the projections 25, which define the boundaries between the abutting surfaces 24A and the projections, are formed as the walls 25B which are concave. This arrangement brings about the effects described below.

When a worker inserts the mounts 24 of the mounting member 21 between the inner side surface of the disc 1 and the supports 2A of the knuckle 2 and brings the mating surfaces 2C in contact with the abutting surfaces 24A to install the mounting member 21 to the knuckle 2, he can roughly position the mounts to the supports by bringing the upper surfaces of the supports 2A against the walls 25B of the projections 25 to surely prevent the mounting member 21 from being further inserted from the position of the rough installation shown in FIG. 3, in the direction indicated by arrow A.

As a result, the protective boots 9 and the inner side pad receivers 14C of the pad springs 14 can surely be prevented from, as pointed out in the description of prior art, being damaged or broken due to the hitting of the protective boots 9, pad springs 14, or the like against the upper surfaces of the supports 2A in the direction indicated by arrow A when the mounting member 21 is installed to the knuckle 2, that is, a non-rotating part of a vehicle.

The present embodiment therefore enables the mounts 24 of the mounting member 21 to be roughly positioned through the projections 25 to the supports 2A of the knuckle 2. Then, by fastening the mounts 24 of the mounting member 21 and the knuckle 2 together by screwing positioning members, such as bolts, into the bolt holes 2B and threaded holes 24B, they are fastened together efficiently.

Resting (rough positioning) the upper surfaces of the supports 2A against the walls 25B of the projections 25 allows the mounts 24 of the mounting member 21 to be easily positioned relative to the supports 2A of the knuckle 2. The time taken by the positioning is reliably reduced, and the bolts are more easily screwed into the bolt holes 2B and threaded holes 24B.

FIG. 4 shows a second embodiment of the present invention. In FIG. 4, the same elements as in the case of the first embodiment are given the same reference numbers to omit the descriptions of the elements. The second embodiment is characterized in that the body 22 of the mounting member 21 is provided with a pair of mounts 31 (only one of these is shown) and that the mounts are provided with projections 32 generally of a prism-like shape (only one of these is shown), extending substantially linearly on the outer side of the abutting surfaces 31A in the direction of the radius of the disc 1.

Although the mounts 31, formed almost the same way as the mounts 24 of the first embodiment, have the abutting surfaces 31A and threaded holes 31B, the projections 32, positioned above the abutting surfaces 31A, substantially linearly extend in a horizontal direction in FIG. 4. The faces 32A of the projections 32 are flat, and the boundaries between the projections and the abutting surfaces 31A are flat walls 32B linearly extending along the tops of the abutting surfaces 31A.

The second embodiment arranged as described above has almost the same effects as the first embodiment. Particularly in the second embodiment, however, forming the walls 32B of the projections 32 so that the walls are flat (linear) enables a mold for integrally forming the mounting member 21 including the projections 32 to be given a simple shape, thus reducing the cost of the mold.

FIG. 5 shows a third embodiment of the present invention. In FIG. 5, the same elements as in the case of the first embodiment are given the same reference numbers to omit the descriptions of the elements. The third embodiment is characterized in that the body 22 of the mounting member 21 is provided with a pair of mounts 41 (only one of these is shown) and that the mounts are provided with generally wedge-shaped projections 42 (only one of these is shown) on the outer side of abutting surfaces 41A in the direction of the radius of the disc 1.

The mounts 41, formed almost the same way as the mounts 31 of the second embodiment, have threaded holes 41B for installation at the centers of the abutting surfaces 41A. In the mounts 41, however, the boundaries between the abutting surfaces 41A and the projections 42 slant upward from left to right in FIG. 5. Thus, the lower surfaces of the projections 42 are inclined walls 42B, although the faces 42A of the projections are formed as flat surfaces.

The third embodiment arranged as described above has almost the same effects as the first embodiment. Particularly in the third embodiment, however, forming the walls 42B of the projections 42 so that the walls are slanted enables the width of the projections 42 to be progressively larger from right to left in FIG. 5, thus effectively increasing the mechanical strength of the projections 42.

FIGS. 6 and 7 show a fourth embodiment of the present invention. The fourth embodiment is characterized in that grooves are formed along the peripheral surfaces of the mounts of the mounting member. In FIGS. 6 and 7, the same elements as in the case of the first embodiment are given the same reference numbers to omit the descriptions of the elements.

In FIGS. 6 and 7, numeral 51 indicates a disc brake mounting member to be installed to a non-rotating part of a vehicle. Like the mounting member 21 of the first embodiment, the mounting member 51 has a body 52 and arms 53. In the mounting member 51, however, the head ends of the arms 53 are integrally joined together on the outer side of the disc 1, using an auxiliary beam 54. The mounting member 51 is produced by, for example, casting the mounting member body 52, arms 53, and auxiliary beam 54 as a unit, and the mounting member body 52 is provided with mounts 55, described later, together with projections 56.

Numerals 55 indicate a pair of mounts provided at both ends of the mounting member body 52. Like the mounts 24 of the first embodiment, the mounts 55 have abutting surfaces 55A and threaded holes (not shown) for installation. As shown in FIG. 7, however, the projections 56, described later, are formed above the abutting surfaces 55A so that the projections are integral with the mounts 55. Grooves 57, described later, are formed in the peripheral surfaces 55B of the mounts 55.

Numerals 56 indicate projections integrally formed above the abutting surfaces 55A (outer side in the direction of the radius of the disc 1) with the mounts 55. The projections 56, formed almost the same way as the projections 25 of the first embodiment, have flat faces 56A and walls 56B, that is, the lower surfaces serving as the boundaries between the projections and the abutting surfaces 55A. Gates for forming the whole mounting member 51 by casting, for example, are provided on the faces 56A of the projections 56.

Numerals 57 designate grooves provided in the peripheral surfaces of the mounts 55. As shown in FIG. 7, the grooves 57 that are formed to be shallow and substantially U-shaped in cross section extend in the peripheral surfaces 55B of the mounts 55 and depressed in the direction from inside the disc 1 toward the circumference of the disc 1. The grooves extend up to the positions corresponding to the walls 56B of the projections 56. The grooves 57 are arranged inside the outer peripheries of the projections 56 to reduce the thickness of the walls of the mounts 55 (thickness of the surroundings of the threaded holes) which does not include the wall of the projections 56.

The fourth embodiment arranged as described above has nearly the same effects as the first embodiment. Particularly in the fourth embodiment, however, reducing the thickness of the walls of the mounts 55 surrounding the threaded holes only on the inner side in the direction of the radius of the disc 1 by forming the grooves 57 enables the thickness of the mounting member 51 consisting of the mounting member body 52, arms 53, and auxiliary beams 54 to be uniform, thus preventing the mounts 55 of the mounting member body 52 from having thicker walls than other parts.

Providing gates on the faces 56A of the projections 56 to mold the whole mounting member 51 including the mounts 55 allows molten metal to be smoothly led to the walls having the grooves, thereby solving casting problems, such as cavities left around the threaded holes in the mounts 55. This allows the whole mounting member 51 including the mounts 55 to be accurately formed, and the mechanical strength of the mounts 55 to be increased without failure.

Although the inner leg 7A of the caliper 7 which is provided with the two cylinder bores 7A1 is taken as an example in the above descriptions of the embodiments, the present invention is not limited to such an inner leg. For example, an arrangement may be used wherein the inner leg is provided with three or more cylinder bores into which pistons are inserted. In some cases, the inner leg may be provided with one cylinder bore.

In the embodiments described above, the dimension L between the mounts 5 is made a littler shorter than the dimension L1 between the pad guides 6B of the arms 6 and a little longer than the dimension L2 between the cylinder bores 7A1. Instead, the dimension L between the mounts 5 may be set a little longer than the dimension L1 or a little shorter than the dimension L2.

The embodiments described above presume that a disc brake of the present invention is used on an automobile, but the present invention applies not only to an automobile but to other vehicles including a motorcycle.

In the fourth embodiment, even when gates are provided on the projections 56 to integrally mold the whole mounting member 51 including the mounts 55, the grooves ensure that molten metal uniformly runs into the whole wall portions of the mounts surrounding the installation holes, so that cavities can effectively be prevented from occurring around the installation holes in the mounts. Moreover, the grooves allow the whole mounting member 51 including the mounts 55 to be accurately formed and the mechanical strength of the mounts 55 to be effectively increased.

What is claimed is:

1. A disc brake mounting member comprising:

a pair of mounts adapted to be secured to a knuckle of a vehicle on one side of a disc;

a first arm positioned on an outer side of one of said pair of mounts with respect to a radial direction of the disc; and a second arm positioned on an outer side of the other one of said pair of mounts with respect to a radial direction of the disc, said first and second arms being adapted to support a caliper so that the caliper can slide in an axial direction of the disc, wherein each of said mounts includes an abutting surface to be positioned against the knuckle of the vehicle, an installation hole formed in a central portion of said abutting surface and extending in the axial direction of the disc for receiving a positioning member, and a projection positioned on an outer side of said abutting surface relative to a radial direction of the disc, said projection projecting along the axial direction of the disc such that said projection will engage an upper surface of the knuckle when said mounts are inserted between the disc and said knuckle.

2. A disc brake mounting member according to claim 1, wherein a groove is formed on a portion of a peripheral wall of each of said mounts which does not include the peripheral wall of said projection.

3. A disc brake mounting member according to claim 1, wherein said projection of each of said mounts has a concave surface facing inwardly in a radial direction of the disc.

4. A disc brake mounting member according to claim 1, wherein said projection of each of said mounts is generally of a prism-like shape having a flat surface facing inwardly in a radial direction of the disc.

5. A disc brake mounting member according to claim 1, wherein said projection of each of said mounts is generally of a wedge-like shape having a slant flat surface facing inwardly in a radial direction of the disc.

* * * * *